(12) United States Patent
Ishibashi et al.

(10) Patent No.: US 9,768,468 B2
(45) Date of Patent: Sep. 19, 2017

(54) BATTERY MANUFACTURING METHOD AND MANUFACTURING DEVICE

(71) Applicant: NISSAN MOTOR CO., LTD., Yokohama-Shi, Kanagawa (JP)

(72) Inventors: Keisho Ishibashi, Kanagawa (JP); Ryo Inoue, Kanagawa (JP); Natsumi Satoh, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/038,929

(22) PCT Filed: Oct. 17, 2014

(86) PCT No.: PCT/JP2014/077666
§ 371 (c)(1),
(2) Date: May 24, 2016

(87) PCT Pub. No.: WO2015/087618
PCT Pub. Date: Jun. 18, 2015

(65) Prior Publication Data
US 2017/0005360 A1    Jan. 5, 2017

(30) Foreign Application Priority Data

Dec. 9, 2013   (JP) ................................ 2013-253728

(51) Int. Cl.
*H01M 10/04* (2006.01)
*H01M 10/0525* (2010.01)
(Continued)

(52) U.S. Cl.
CPC ....... *H01M 10/0525* (2013.01); *H01M 2/365* (2013.01); *H01M 10/0404* (2013.01);
(Continued)

(58) Field of Classification Search
CPC ......... H01M 10/0404; H01M 10/0436; H01M 10/0525; H01M 10/0585; H01M 2/021; H01M 2/0212; H01M 2/365
See application file for complete search history.

(56) References Cited

U.S. PATENT DOCUMENTS

| 5,117,677 A * | 6/1992 | Hendershot ............. G01M 3/32 340/605 |
| 2004/0103526 A1* | 6/2004 | Erhardt ..................... H01G 9/08 29/623.1 |

(Continued)

FOREIGN PATENT DOCUMENTS

| DE | WO 2014118057 A1 * | 8/2014 | ........... H01M 2/362 |
| JP | H0935704 A | 2/1997 | |

(Continued)

*Primary Examiner* — Emily Le
*Assistant Examiner* — Lilia V Nedialkova
(74) *Attorney, Agent, or Firm* — Young Basile Hanlon & MacFarlane, P.C.

(57) ABSTRACT

A battery manufacturing method has a first depressurization step of depressurizing the inside of a liquid injecting chamber, an injection step of injecting, in the inside of the liquid injecting chamber, a liquid electrolyte into the battery through an opening portion formed at the top end of an outer case body of the battery, a second depressurization step of depressurizing the inside of a sealing chamber and a sealing step of sealing the opening portion in the inside of the sealing chamber. Vacuum attainment time until the pressure of the inside of the liquid injecting chamber becomes at a predetermined vacuum degree is measured in the first depressurization step, and if this vacuum attainment time exceeds a first threshold, a depressurization rate is reduced and a depressurization time is extended.

6 Claims, 10 Drawing Sheets

(51) Int. Cl.
- *H01M 10/0585* (2010.01)
- *H01M 2/36* (2006.01)
- *H01M 2/02* (2006.01)

(52) U.S. Cl.
CPC ... *H01M 10/0436* (2013.01); *H01M 10/0585* (2013.01); *H01M 2/021* (2013.01); *H01M 2/0212* (2013.01)

(56) References Cited

U.S. PATENT DOCUMENTS

| | | | | |
|---|---|---|---|---|
| 2013/0247364 | A1* | 9/2013 | Fukatsu | H01M 10/0404 29/623.2 |
| 2015/0364746 | A1* | 12/2015 | Wipperfuerth | H01M 2/362 141/1.1 |

FOREIGN PATENT DOCUMENTS

| | | |
|---|---|---|
| JP | 2009170368 A | 7/2009 |
| JP | 3174417 U | 3/2012 |
| JP | 2013012340 A | 1/2013 |
| JP | 2013140783 A | 7/2013 |
| JP | 2013152834 A | 8/2013 |

* cited by examiner

US 9,768,468 B2

BATTERY MANUFACTURING METHOD AND MANUFACTURING DEVICE

CROSS REFERENCE TO RELATED APPLICATION

The present application claims priority to Japanese Patent Application No. 2013-253728, filed Dec. 9, 2013, incorporate herein in its entirety.

TECHNICAL FIELD

The present invention relates to a method and a device for manufacturing a battery for injecting a liquid electrolyte into the battery.

BACKGROUND

In a case where batteries such as a lithium battery in which an electrode laminated body and a liquid electrolyte are sealed inside an outer case body of the battery are manufactured, to improve permeability of the liquid electrolyte, there has been known a method in which the inside of a liquid injecting chamber is depressurized to a predetermined vacuum state by a liquid injecting vacuum pump, and in which, in the inside of this liquid injecting chamber which has been depressurized, the liquid electrolyte is injected through an opening portion of the outer case body of the battery (see Japanese Patent Application Publication H9-35704).

In this way, after injecting the liquid electrolyte in the vacuum state, for example, this battery is allowed to stand still in atmospheric pressure conditions for a certain period of time to progress impregnation of the liquid electrolyte. After that, the battery is transferred to a sealing chamber. By depressurizing the inside of this sealing chamber to the predetermined vacuum state, after exhausting a gas remaining inside the outer case body, the opening portion is sealed by heat-welding, etc.

SUMMARY

In the injection in the vacuum state, the liquid electrolyte is inevitably volatilized. Therefore, as to setting of the injection amount of the liquid electrolyte by the liquid injecting pump, the volatilization amount that the liquid electrolyte will be volatilized is considered in advance, and the injection amount is set by adding the volatilization amount to a prescribed injection amount of the liquid electrolyte actually required for the inside of the battery.

However, at the time of the injection, it is not possible to completely suppress scattering the liquid electrolyte in the liquid injecting chamber. Consequently, when the injection is repeated, some amount of the liquid electrolyte scattered in the liquid injecting chamber adheres to and remains on an inner wall surface, etc., of the liquid injecting chamber. In addition, the liquid electrolyte remaining in the liquid injecting chamber is not completely volatilized even in the vacuum state. The liquid electrolyte remaining in the liquid injecting chamber therefore cannot be completely removed even if the inside of the liquid injecting chamber is depressurized to the predetermined vacuum state once. That is, if the injection is repeated, some amount of the liquid electrolyte inevitably remains in the chamber.

In this way, if the liquid electrolyte remaining in the liquid injecting chamber increases, this remaining liquid electrolyte is volatilized at the time of the depressurization, and therefore the inside of the liquid injecting chamber does not reach a predetermined vacuum degree even if the depressurization is performed for a predetermined time. That is, a vacuum attainment time until the inside of the liquid injecting chamber reaches the predetermined vacuum degree becomes longer, and the depressurization tends not to be sufficiently performed. In addition, since the liquid electrolyte remaining in the chamber is volatilized, a liquid electrolyte during the injection which had been expected to be volatilized is not volatilized, and the volatilization amount of the liquid electrolyte during the injection decreases. Therefore, the injection amount of the liquid electrolyte becomes excessive.

From these, the depressurization of the inside of the chamber tends to be insufficient, impregnation of the liquid electrolyte to the inside of the outer case body tends not to progress, and a surplus liquid electrolyte becomes in a state of remaining at the vicinity of the opening portion of the top end of the outer case body. In addition, the gas inside the outer case body tends not to be sufficiently exhausted. If the battery in this state is transferred into a sealing chamber and the depressurization of the sealing chamber is performed, the liquid electrolyte remaining at the vicinity of the opening portion of the top end of the outer case body boils sharply (bumping) and bubbles, and then leaks out. Therefore, there is a fear about deterioration in quality caused by adhering the liquid electrolyte to a surface of the outer case body. In addition, the gas remaining inside the outer case body is also not sufficiently exhausted.

The present invention has been made in consideration of such a situation. An object of the present invention is to provide a new method and a new device for manufacturing a battery which are capable of suppressing the leakage of the liquid electrolyte at the time of the sealing after the repetition of the injection and accelerating the exhaust of the gas remaining inside the outer case body even in a case where the liquid electrolyte remains in the liquid injecting chamber with time caused by the repetition of the injection.

The present invention relates to manufacturing for a battery in which an electrode laminated body and a liquid electrolyte are sealed inside an outer case body of the battery, having:

a first depressurization step of depressurizing an inside of a liquid injecting chamber to a vacuum state using a liquid injecting vacuum pump;

an injection step of injecting, in the inside of the liquid injecting chamber which has been depressurized, the liquid electrolyte into the battery through an opening portion formed at a top end of the outer case body of the battery;

a second depressurization step of depressurizing an inside of a sealing chamber at which the battery has been positioned to a vacuum state using a sealing vacuum pump; and a sealing step of sealing the opening portion in the inside of the sealing chamber which has been depressurized.

In addition, in the above first depressurization step, a vacuum attainment time until the pressure of the inside of the liquid injecting chamber becomes at a predetermined vacuum degree is measured, and, based on this vacuum attainment time, at least one of a depressurization rate and a depressurization time by the above sealing vacuum pump is changed.

In a case where the liquid electrolyte remains in the liquid injecting chamber, while the pressure of the inside of the liquid injection chamber is depressurized from approximately atmospheric pressure to the predetermined vacuum state, that is, evacuation, the vacuum attainment time until the pressure of the inside of the liquid injecting chamber becomes in the vacuum state becomes longer because the remaining liquid electrolyte is volatilized. Therefore, by this vacuum attainment time, a condition of the liquid electrolyte remaining in the liquid injecting chamber can be judged. Specifically, when the vacuum attainment time becomes longer, it is possible to judge that a large amount of the liquid electrolyte remains in the chamber.

Therefore, the vacuum attainment time is measured, and, based on this vacuum attainment time, at least one of the depressurization rate and the depressurization time by the sealing vacuum pump is changed and corrected, and thereby, even in a case where the large amount of the liquid electrolyte remains in the liquid injecting chamber, leakage of the liquid electrolyte at the time of the sealing can be suppressed and exhaust of the gas remaining inside the outer case body can be accelerated.

Specifically, in a case where the above vacuum attainment time exceeds a first judgement time, it is judged that the large amount of the liquid electrolyte remains in the liquid injecting chamber, and by reducing the depressurization rate of the above sealing vacuum pump, bumping and bubbling of a liquid electrolyte remaining at a vicinity of the opening portion formed at the top end of the outer case body can be suppressed. Thus, the leakage of the liquid electrolyte caused by the bumping and the bubbling of the liquid electrolyte can be suppressed.

In conjunction with this reduction of the depressurization rate, by extending the depressurization time by the sealing vacuum pump, even if the depressurization rate is reduced, an impregnation property of the liquid electrolyte can be improved and the exhaust of the gas remaining in the outer case body can be accelerated.

However, in this way, if the vacuum attainment time and the depressurization time become longer, manufacturing time becomes longer and working efficiency decreases. Therefore, preferably, in a case where the vacuum attainment time exceeds a second judgement time that is a time shorter than the above first judgement time, warning is given to urge workers to clean the liquid injecting chamber. By cleaning the liquid injecting chamber, it becomes possible to reduce the liquid electrolyte remaining in the liquid injecting chamber causing reduction of production efficiency.

As mentioned above, according to the present invention, even in a case where the liquid electrolyte remains in the liquid injecting chamber with time caused by repeating the injection, the leakage of the liquid electrolyte at the time of the sealing after that can be suppressed and the impregnation property of the liquid electrolyte can be also improved.

DETAILED DESCRIPTION OF THE EMBODIMENTS

Figure 1:
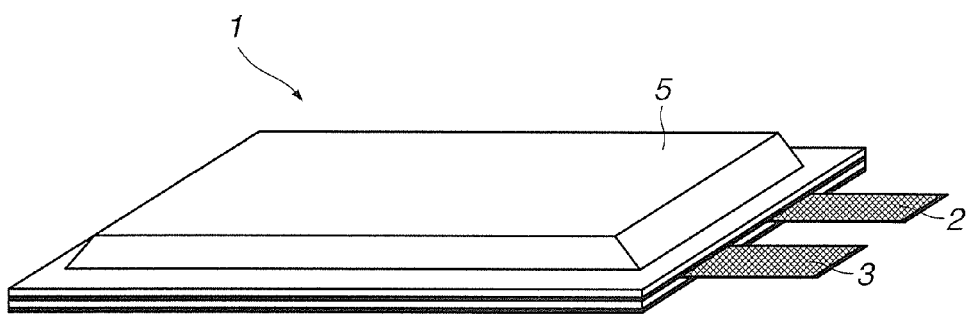
FIG. 1 is a perspective view showing a film outer case battery to which a device for injecting a liquid electrolyte into a battery according to the present invention is applied.
Figure 2:
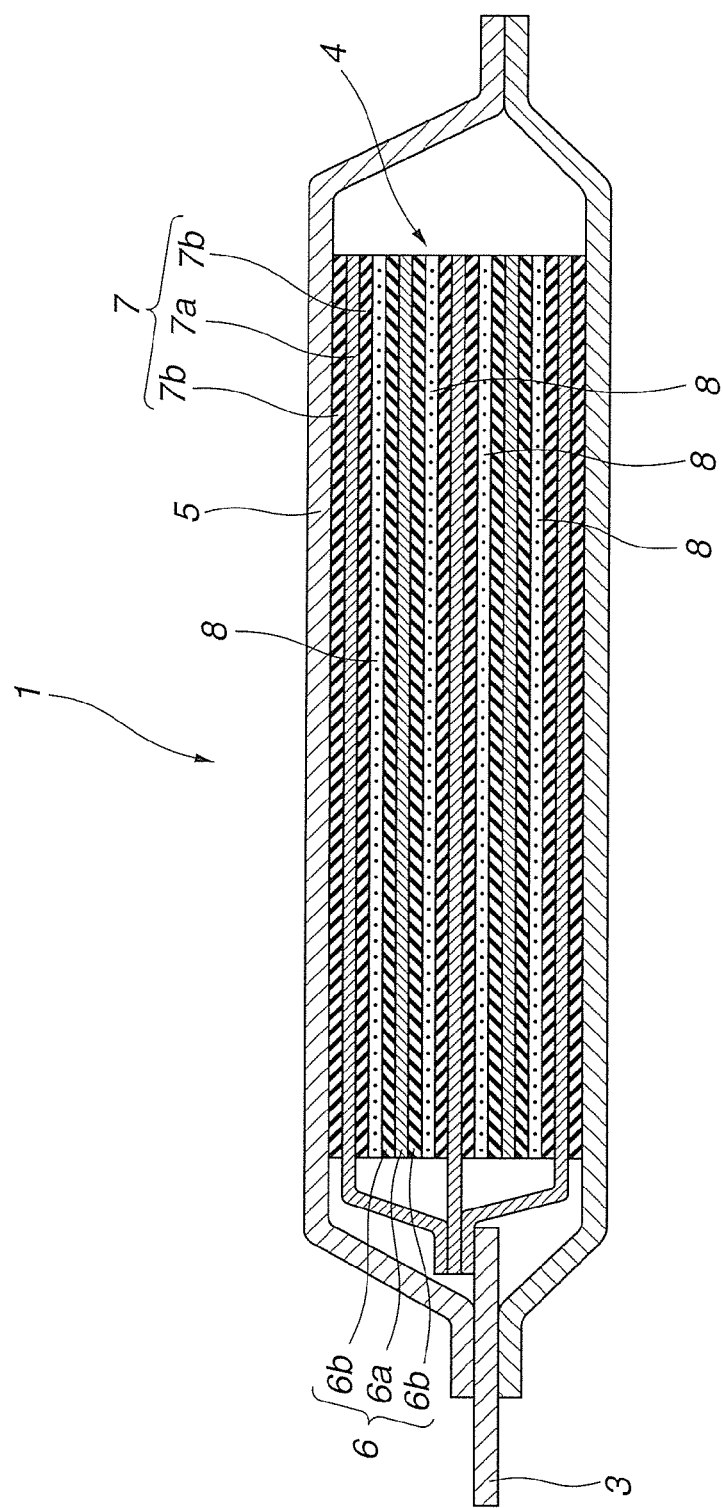
FIG. 2 is a sectional view showing the above film outer case battery.

In the following, the present invention is explained according to the embodiment shown in the drawings. First, a film outer case battery that is one embodiment of a battery into which a liquid electrolyte is injected is explained with reference to FIG. 1 and FIG. 2. This film outer case battery 1 is, for example, a lithium ion secondary battery. Film outer case battery 1 has a flat rectangular appearance shape. A pair of terminals 2 and 3 made of a conductive metal foil is equipped at one of end edges in a longitudinal direction of film outer case battery 1. This film outer case battery 1 is one in which rectangular electrode laminated body 4 is accommodated with the liquid electrolyte in outer case body 5 made of a laminated film. The above electrode laminated body 4 has a structure in which a plurality of positive electrode plates 6 and negative electrode plates 7 are alternately laminated through separators 8. The plurality of positive electrode plates 6 are connected to positive electrode terminal 2. Similar to this, the plurality of negative electrode plates 7 are connected to negative electrode terminal 3. Positive electrode plate 6 is one in which both surfaces of positive electrode current collector 6a made of a metal foil, such as an aluminum foil, are coated with positive electrode active material layer 6b. The same as this, negative electrode plate 7 is one in which both surfaces of negative electrode current collector 7a made of a metal foil, such as an aluminum foil, are coated with negative electrode active material layer 7b.

Outer case body 5 has a structure formed by two laminated films, and one of the laminated films is provided at an under surface side of electrode laminated body 4 and the other is provided on a top surface side of electrode laminated body 4. Four sides of the periphery of these two laminated films are overlapped and heat-welded each other along those edges. The pair of terminals 2 and 3 positioned at a short side of rectangular film outer case battery 1 is drawn out through a joint surface of the laminated films when the laminated films are heat-welded each other.

In addition, in the embodiment shown in the drawings, the pair of terminals 2 and 3 is arranged side by side at the same one of the edges. However, positive electrode terminal 2 can be arranged at one of the edges and negative electrode terminal 3 can be arranged at the other edge.

A manufacturing procedure of the above film outer case battery 1 is as follows. First, in a lamination step, electrode laminated body 4 is formed by laminating positive electrode plates 6, negative electrode plates 7 and separators 8 in order and attaching terminals 2 and 3 by spot-welding. Next, this electrode laminated body 4 is covered with the laminated films that become outer case body 5 and three sides of the periphery of this laminated films are heat-welded each other except one side. Next, the liquid electrolyte is injected into outer case body 5 through an open one side and it is filled with the liquid electrolyte, following which, by heat-welding the open one side, outer case body 5 becomes in a sealed state. With this, film outer case battery 1 is completed. Next, film outer case battery 1 is charged to a proper level. In this state, aging of film outer case battery 1 is conducted for a certain period of time. After finishing this aging, film outer case battery 1 is charged again for a voltage inspection, and then is shipped.

In addition, film outer case battery 1 of this type is used as a battery module in which a plurality of film outer case batteries 1 are accommodated in a flat box-shaped casing. In this case, it has an arrangement in which the plurality of film outer case batteries 1 are stacked in the casing of the battery module. For example, outer case body 5 can be in a state of being slightly pressed in a laminating direction of electrode laminated body 4 (direction orthogonal to a main surface of electrode laminated body 4) by a part of the casing or an elastic member different from the casing.

As an organic liquid solvent used for the liquid electrolyte, in addition to ester based solvents such as propylene carbonate (PC), ethylene carbonate (EC), dimethyl carbonate (DMC) and methyl ethyl carbonate, it is possible to use ether based solvents such as γ-butyrolactone (γ-BL) and diethoxyethane (DEE). Furthermore, it is possible to use an organic liquid solvent in which other solvents are mixed and prepared.

Figure 3:
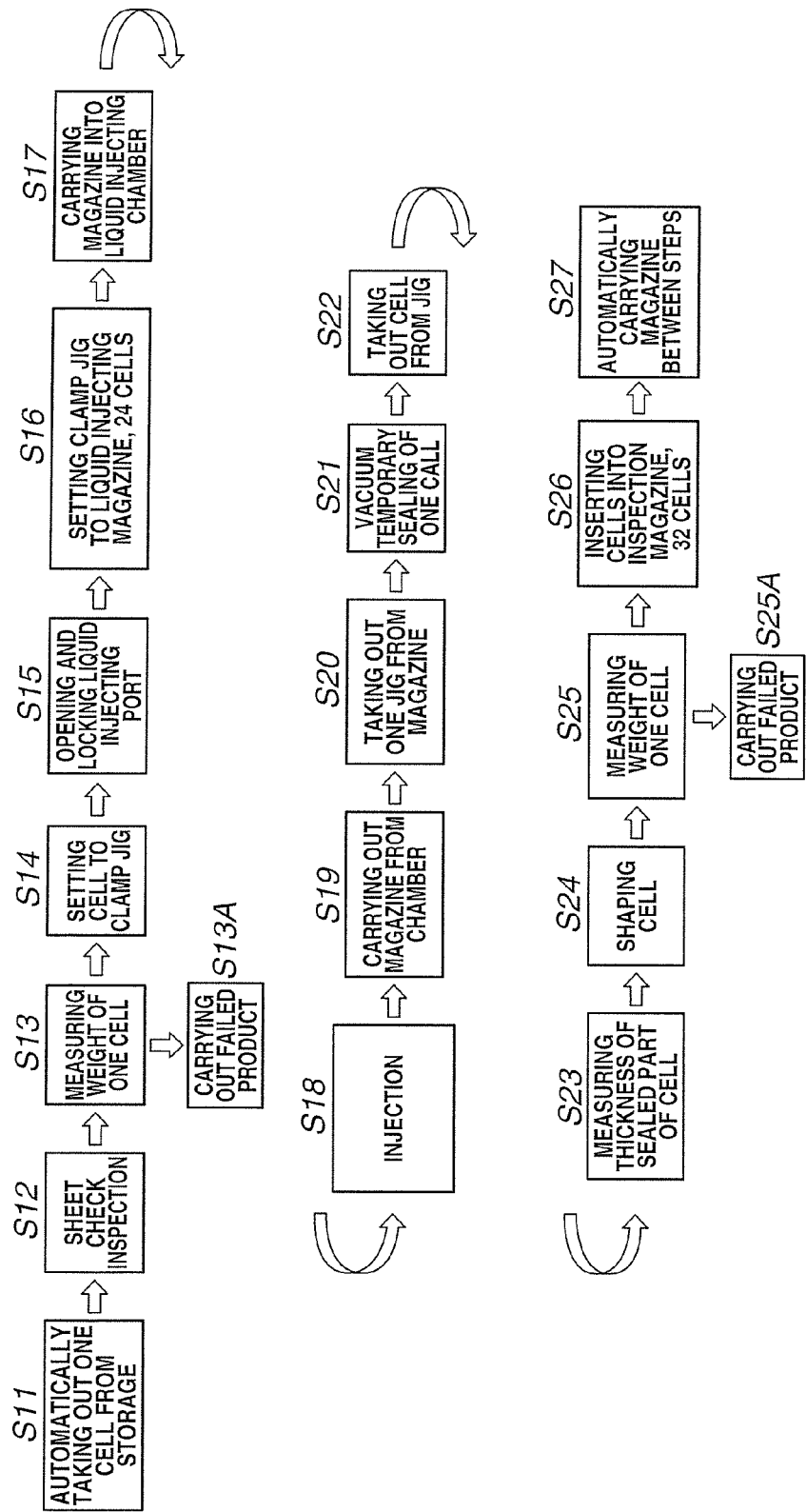
FIG. 3 is a block diagram showing flow of an injection step.

FIG. 3 is an explanation drawing simply showing an injection step that is a part of a manufacturing step of film outer case battery 1.

In step S11, one film outer case battery 1 (in the following, it is also called "cell") is automatically taken out from a storage. In step S12, a sheet check inspection of this one cell is carried out. In step S13, the weight of this one cell is measured. If the weight of this one cell does not satisfy a predetermined weight range, that is, this one cell is a failed product, the step moves on to step S13A, and this one cell is carried out as a failed product and excluded from this injection step.

Figure 6:
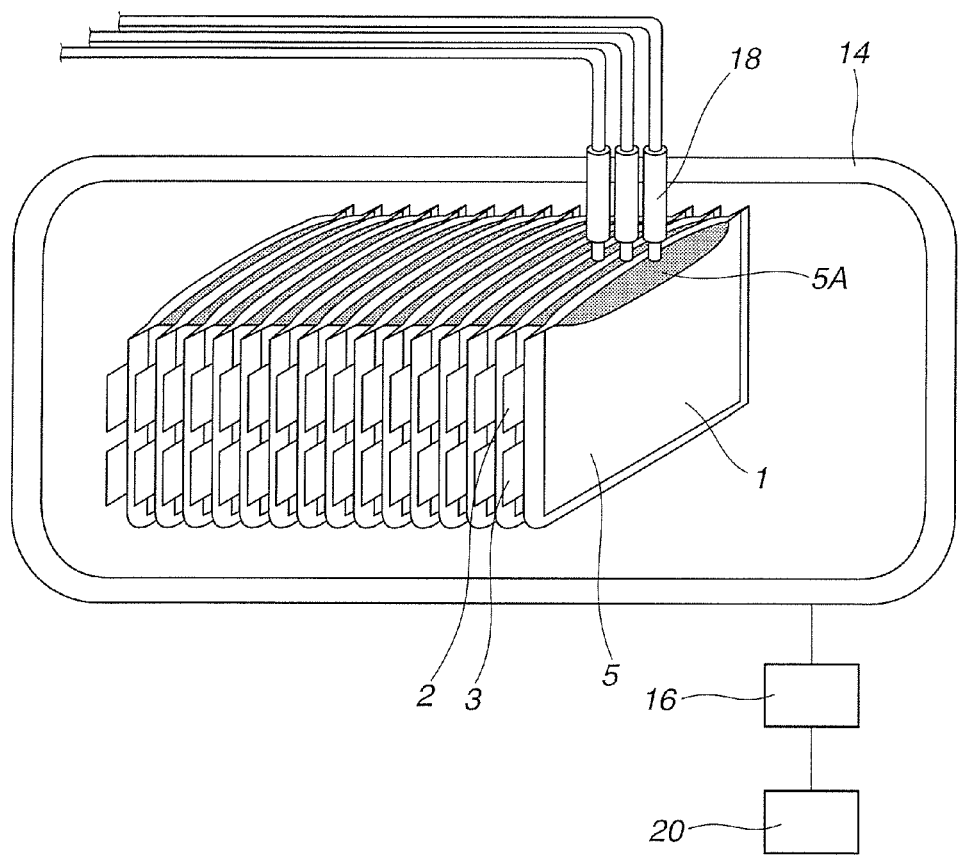
FIG. 6 is also an explanation drawing showing the whole configuration of the liquid injecting device of the present embodiment.

In step S14, the cell is set to a clamp jig. In step S15, one of the sides (top side) which becomes a liquid injecting port of film outer case battery 1 is opened by a cutter, etc., and is positioned and locked to the clamp jig. In step S16, a plurality of the clamp jigs respectively holding the cells (in this embodiment, 24 cells) are set to a liquid injecting magazine. In step S17, the liquid injecting magazine is carried into liquid injecting chamber 14. Then, in step S18, as mentioned below, the liquid electrolyte is injected into each of the cells respectively held by the jigs. That is, as shown in FIG. 6, the inside of liquid injecting chamber 14 is depressurized to a vacuum state (first depressurization step) by using liquid injecting vacuum pump 16, and, in the inside of liquid injecting chamber 14 which has been depressurized to the vacuum state in this way, the liquid electrolyte is injected into battery 1 through opening portion 5A formed at the top end of outer case body 5 of battery 1 (injection step).

When the injection finishes, the step moves on to step S19. The magazine is carried out from liquid injecting chamber 14 and is allowed to stand still in atmospheric pressure conditions for a certain period of time (for example, a few minutes) (impregnation step). In this way, by injecting the liquid electrolyte in the vacuum state, since a gas remaining inside electrode laminated body 4 of battery 1 is at atmospheric pressure, the gas inside electrode laminated body 4 expands by a pressure difference from the outside of outer case body 5 that is in the vacuum state, and the gas tends to be released from the inside of outer case body 5. In addition, after injecting the liquid electrolyte, by allowing battery 1 to stand still in atmospheric pressure conditions for the certain period of time, it is possible to accelerate the impregnation of the liquid electrolyte to the inside of electrode laminated body 4 by a pressure difference generated when the vacuum state returns to atmospheric pressure conditions.

Figure 4:
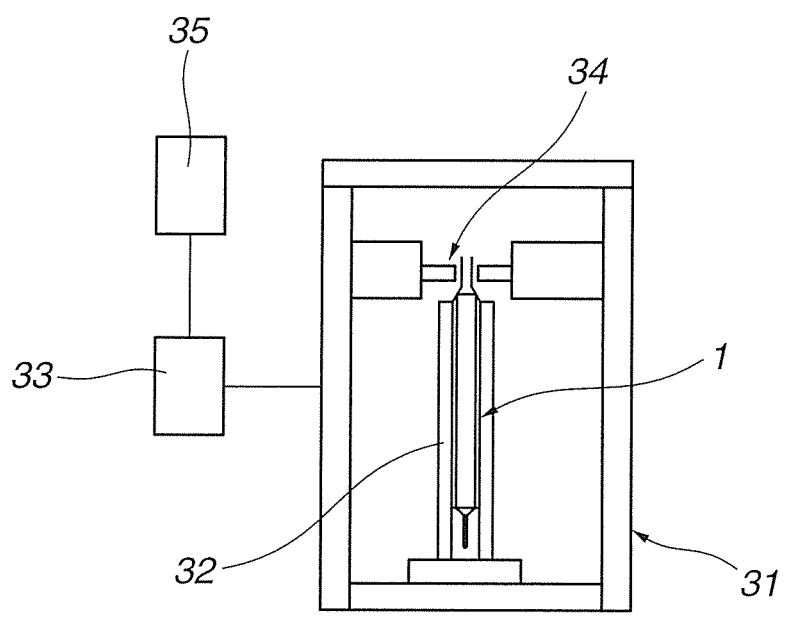
FIG. 4 is an explanation drawing showing a whole configuration of the liquid injecting device of the present embodiment.

In the following step S20, one jig is taken out from the magazine. In step S21, vacuum temporary sealing of one cell (battery) held by the taken-out jig is performed (sealing step). In this vacuum temporary sealing step, as shown in FIG. 4, jig 32 holding one battery 1 (cell) is set to the inside of sealing chamber 31, and the inside of sealing chamber 31 is depressurized to a predetermined vacuum state by sealing vacuum pump 33. Then, to the cell inside sealing chamber 31 which has been depressurized to the vacuum state, opening portion 5A of the top end of the cell is supported between sealing blocks 34, and opening portion 5A is sealed by heat-welding. Operation of the above sealing vacuum pump 33, that is, a depressurization rate and a depressurization time of sealing vacuum pump 33 are controlled by sealing control portion 35.

In step S22, jig 32 is taken out from sealing chamber 31 and the cell is taken out from this jig 32. In step S23, thickness of a sealed part of the cell is measured. In step S24, the cell is shaped, that is, distortion and twisting of the cell are corrected. In step S25, similar to the above step S13, the weight of the one cell is measured again. If the thickness measured in step S23 and the weight measured in step S25 of this one cell do not satisfy predetermined ranges, that is, this one cell is a failed product, the step moves on to step S25A, and it is carried out as a failed product and excluded from this injection step. In step S26, a plurality of normal cells (in this embodiment, 32 cells) which had passed the inspections of step S23 and step S25 are inserted into an inspection magazine. In step S27, the magazine is automatically carried to a next inspection step.

Figure 5:
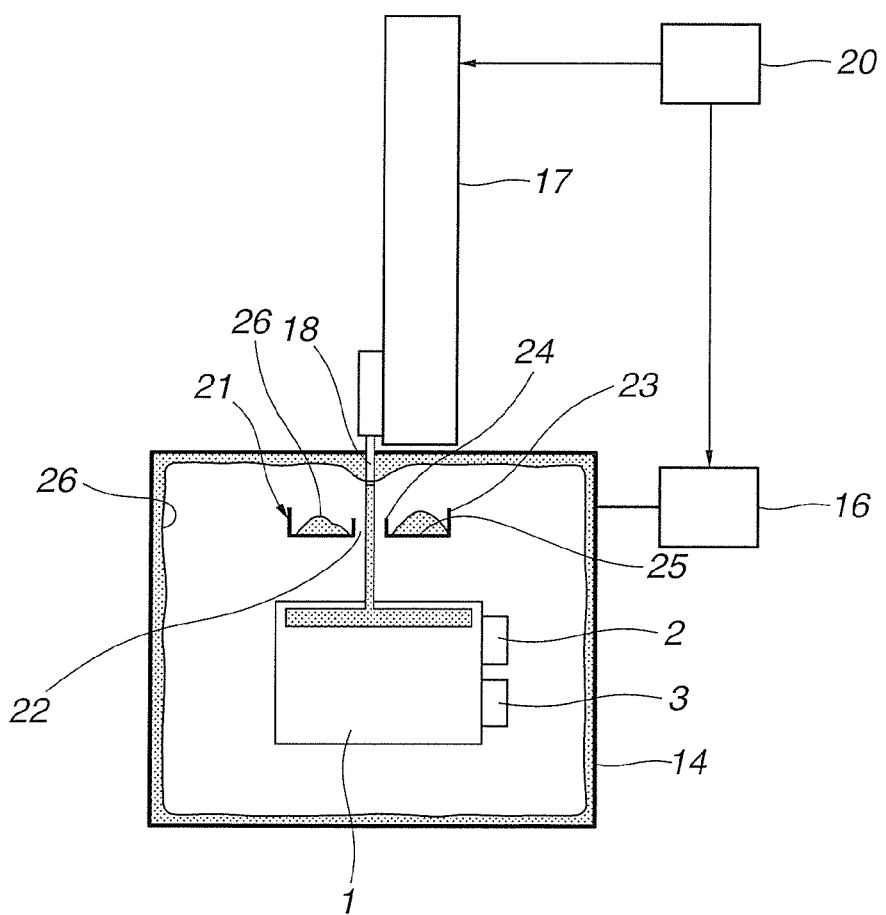
FIG. 5 is also an explanation drawing showing the whole configuration of the liquid injecting device of the present embodiment.

With reference to FIG. 5 and FIG. 6, the inside of liquid injecting chamber 14 at which a liquid injecting magazine (not shown in the drawings) is accommodated is depressurized by constant pressure type liquid injecting vacuum pump 16 and is sealed in a predetermined vacuum state. In the inside of liquid injecting chamber 14 under the vacuum state, the liquid electrolyte is injected through opening portion 5A formed at the top end of outer case body 5 by liquid injecting nozzle 18 of liquid injecting pump 17. In this embodiment, the injection is divided into four sets and performed by six liquid injecting nozzles 18 (in the drawing, three liquid injecting nozzles 18 are shown for convenience) to 24 cells which are positioned in liquid injecting chamber 14. Operation of these liquid injecting pump 17 and liquid injecting vacuum pump 16 is controlled by liquid injecting control portion 20.

In addition, the injection is divided into a plurality of times (in this embodiment, seven times) and is performed to each of the cells to excellently impregnate the liquid electrolyte into the cell. In the injections of a first half, a vacuum degree is set to be high (that is, pressure is low) to mainly release the gas inside the cell. Specifically, the vacuum degree is set at a high vacuum degree of 20 hPa or lower. On the other hand, in the injections of a second half, the vacuum degree is set to be low (that is, pressure is high) to mainly sufficiently impregnate the liquid electrolyte to a part where the gas had been released of the inside of the cell. Specifically, the vacuum degree is set at a low vacuum degree of approximately 200 hPa.

In addition, in a situation except at the time of the injection (for example, at the time when the cell into which the liquid electrolyte is injected is changed), tray 21 is supported to receive a liquid electrolyte dropping down from liquid injecting nozzle 18 in liquid injecting chamber 14 so as not to adhere the liquid electrolyte dropping down from injecting nozzle 18 to a surface, etc., of film outer case battery 1. As to this tray 21, nozzle opening portion 22 through which liquid injecting nozzle 18 is inserted is opened in the middle portion of tray 21. Flange portions 23 and 24 standing upwardly are bent and formed at an inner peripheral edge and an outer peripheral edge of tray 21. Storage portion 25 to receive the liquid electrolyte is formed between both of these flange portions 23 and 24. This tray 21 is supported so as to move upwardly and downwardly in liquid injecting chamber 14. Tray 21 is put on standby at a position lower side than liquid injecting nozzle 18 except at the time of the injection, and, at the time of the injection, tray 21 is moved upwardly and liquid injecting nozzle 18 is inserted through nozzle opening portion 22.

Basically, the injection amount of the liquid electrolyte to be injected is set to an amount obtained by adding, in anticipation of the volatilization amount that is an amount of the liquid electrolyte in which the liquid electrolyte will be volatilized in liquid injecting chamber 14 during the injection, this volatilization amount to a prescribed injection amount required for each of the cells. That is, the injection amount is set to be larger than the prescribed injection amount in consideration of the volatilization amount. However, as shown in FIG. 5, sherbet-like (i.e., in a state between ice and liquid) liquid electrolyte 26 inevitably remains on an inner wall surface of liquid injecting chamber 14 and in storage portion 25 of tray 21 because injection work is repeatedly performed. In this way, in a situation in which liquid electrolyte 26 remains in liquid injecting chamber 14, since liquid electrolyte 26 remaining in liquid injecting chamber 14 is volatilized at the time of the depressurization and the injection, the depressurization rate becomes lower and the volatilization amount of the liquid electrolyte during the injection relatively decreases. Consequently, the injection amount of the liquid electrolyte to be injected into the battery tends to be excessive. From these, the depressurization of the inside of liquid injecting chamber 14 tends to be insufficient, the gas inside outer case body 5 is not sufficiently exhausted, the impregnation of the liquid electrolyte to the inside of electrode laminated body 4 tends not to progress, and a surplus liquid electrolyte tends to be in a state of remaining at the vicinity of opening portion 5A of the top end of outer case body 5. If battery 1 in this state is transferred into sealing chamber 31 and the depressurization is performed, the liquid electrolyte remaining at the vicinity of opening portion 5A of battery 1 boils sharply (bumping) and then leaks out. Therefore, there is a fear about deterioration in quality caused by adhering the liquid electrolyte to the surface of battery 1.

Figure 7:
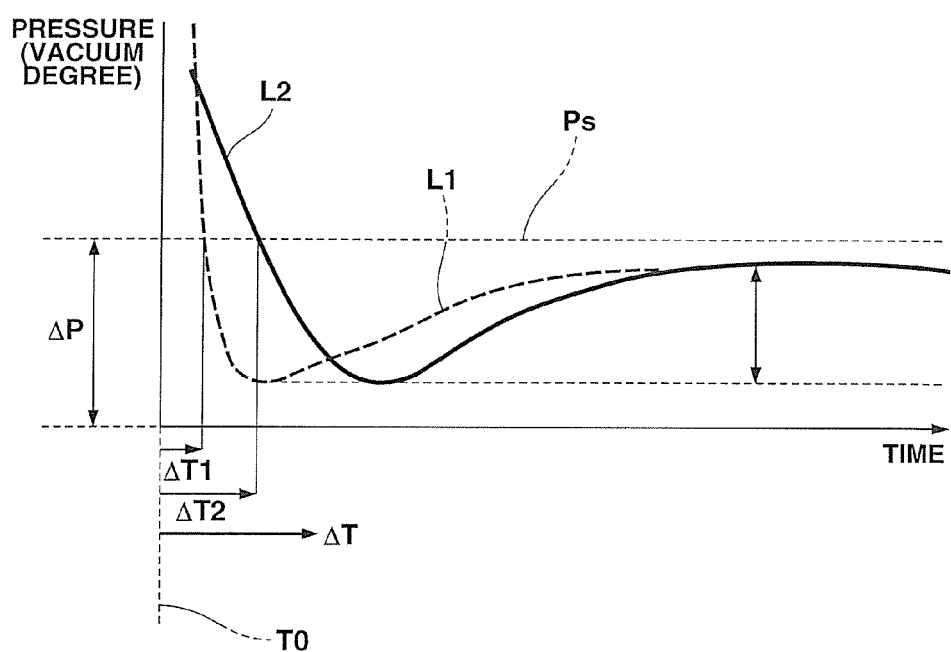
FIG. 7 is an explanation drawing showing a relation between pressure and time at the time of depressurization of a chamber.

With reference to FIG. 7, broken line L1 shows a depressurization characteristic in a clean state in which the liquid electrolyte does not remain in liquid injecting chamber 14. Broken line L2 shows a depressurization characteristic in a state in which the liquid electrolyte exceeding the predetermined level remains in liquid injecting chamber 14. As shown in FIG. 7, as compared with a case where the liquid electrolyte does not remain (characteristic L1), in a case where the liquid electrolyte remains (characteristic L2), lowering of pressure becomes gentle and slow because volatilization of the liquid electrolyte remaining and appearing in liquid injecting chamber 14 occurs. As this result, as to vacuum attainment time $\Delta T$ until the pressure of the inside of liquid injecting chamber 14 becomes in vacuum state $\Delta P$ that is equal to predetermined value Ps or lower from depressurization starting point t0 (in a state at approximately atmospheric pressure) by liquid injecting vacuum pump 16, in a case where the liquid electrolyte remains ($\Delta T2$), it becomes longer than a case where the liquid electrolyte does not remain ($\Delta T1$) ($\Delta T2 > \Delta T1$).

In the present embodiment, based on vacuum attainment time $\Delta T$, a remaining state of the liquid electrolyte in liquid injecting chamber 14 is estimated, and the depressurization rate and the depressurization time at the time of the sealing are changed and corrected according to the remaining state of the liquid electrolyte.

Figure 8:
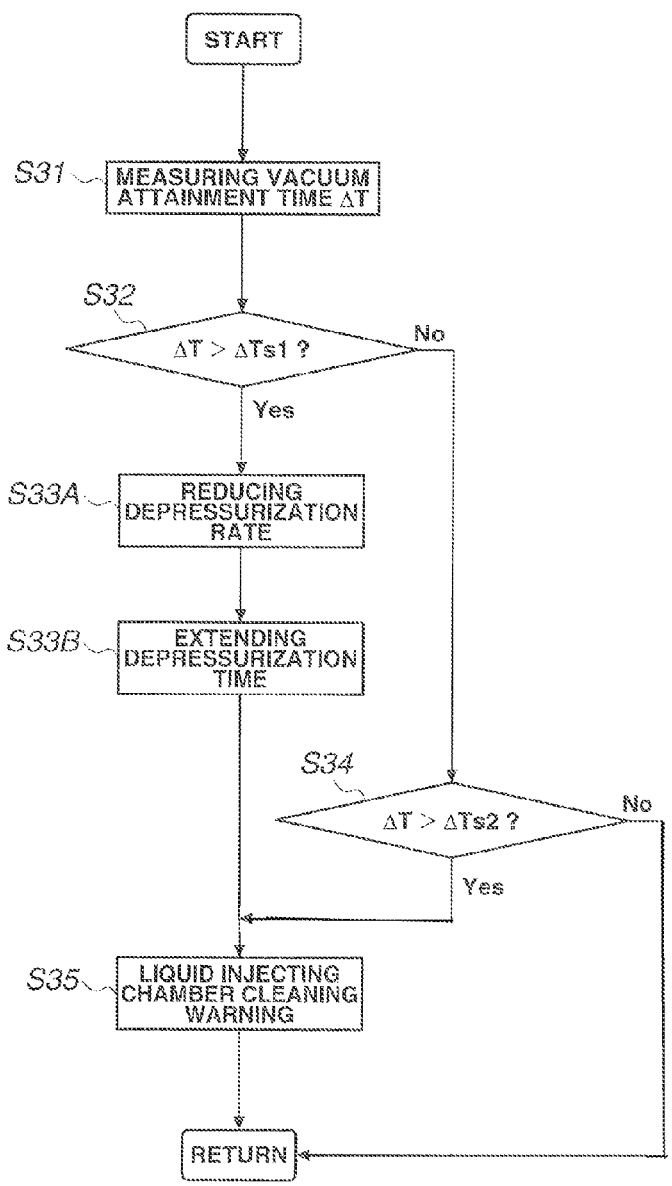
FIG. 8 is a flow chart showing a control flow in which the injection amount of the liquid electrolyte is corrected downwards.

FIG. 8 is a flow chart showing these control flows of the present embodiment. For example, the present routine is repeatedly performed by the above sealing control portion 35.

In step S31, there is measured vacuum attainment time $\Delta T$ until the pressure of the inside of liquid injecting chamber 14 becomes at predetermined value Pa or lower, that is, at a predetermined vacuum degree from depressurization starting point t0 (at approximately atmospheric pressure) by liquid injecting vacuum pump 16. In step S32, it is judged whether this vacuum attainment time $\Delta T$ exceeds first threshold $\Delta Ts1$. For example, in advance, first threshold $\Delta Ts1$ is set as a value obtained by increasing the depressurization time by approximately ten percent with respect to the vacuum attainment time in the clean state in which the liquid electrolyte does not remain in liquid injecting chamber 14.

If vacuum attainment time $\Delta T$ exceeds first threshold $\Delta Ts1$, it is judged that the liquid electrolyte at a predetermined level remains in liquid injecting chamber 14 and that there is a fear about the leakage of the liquid electrolyte at the time of the sealing, the step moves on to steps S33A and S33B, and the depressurization rate and the depressurization time of sealing vacuum pump 33 at the time of the sealing are changed and corrected.

Specifically, in step S33A, the depressurization rate of the sealing vacuum pump is reduced. For example, driving force of a fan and a motor of sealing vacuum pump 33 is reduced, or in a case where the depressurization is performed by a plurality of sealing vacuum pumps 33, by stopping operation of a few sealing vacuum pumps 33, the depressurization rate can be reduced.

In step S33B, the depressurization time (a length of time from starting the depressurization to starting the sealing) of sealing vacuum pump 33 is extended. For example, as shown in FIG. 9, depressurization time $\Delta T4$ is extended approximately two times of standard depressurization time $\Delta T3$.

In step S34, it is judged whether vacuum attainment time $\Delta T$ exceeds second threshold $\Delta Ts2$. This second threshold $\Delta Ts2$ is a value smaller than first threshold $\Delta Ts1$. If vacuum attainment time $\Delta T$ exceeds second threshold $\Delta Ts2$, the step moves on to step S35, and warning is given to urge workers to clean off the liquid electrolyte remaining in liquid injecting chamber 14. This warning is given with sound, lamps, etc.

Figure 9:
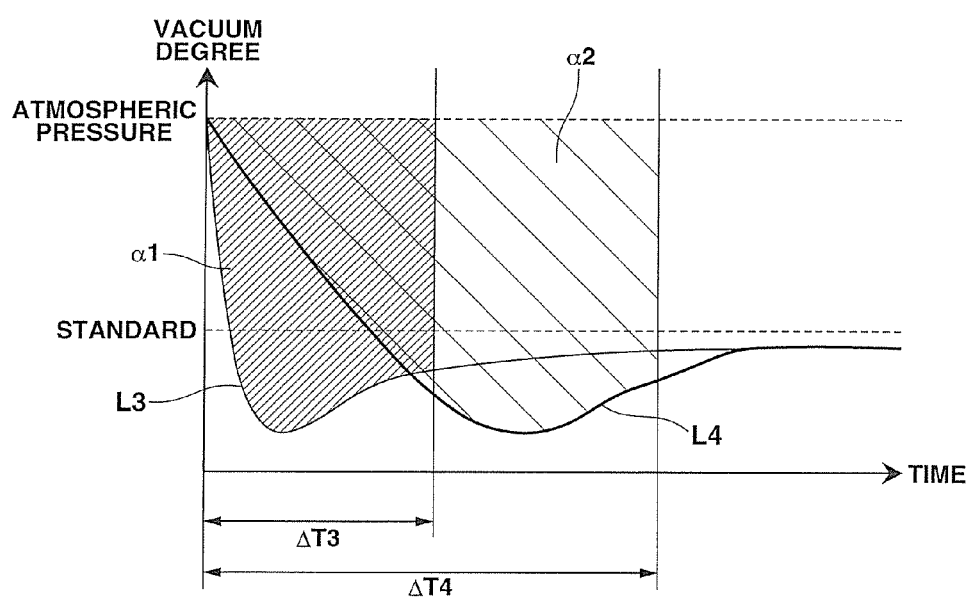
FIG. 9 is an explanation drawing showing a pressure change at the time of depressurization in a sealing step.

FIG. 9 is an explanation drawing showing a pressure change at the time of the depressurization in the sealing step. Thin line L3 in the drawing shows a depressurization characteristic, at a normal time, in which vacuum attainment time $\Delta T$ is equal to first threshold $\Delta Ts1$ or less and the depressurization is performed at a standard depressurization rate and the standard depressurization time. On the other hand, thick line L4 shows a depressurization characteristic, at the time of suppressing the leakage, in which the vacuum attainment time ΔT exceeds first threshold ΔTs1 and the depressurization rate is corrected so as to be reduced and the depressurization time is corrected to be extended.

As shown in the same drawing, in characteristic L4 at the time of suppressing the leakage, the depressurization rate is reduced, and lowering of the pressure therefore becomes gentle. With this, it is possible to sufficiently suppress the sharp boiling, that is, bumping of the liquid electrolyte remaining at the vicinity of opening portion 5A formed at the top end of outer case body 5.

In addition, as shown with hatching areas α1 and α2 in the drawing, an impregnation property correspond to a part of an area obtained by integrating the pressure (vacuum degree) by the depressurization time. As shown in the same drawing, at the time of suppressing the leakage, the depressurization time is extended so that the area becomes larger compared with the area at the normal time (α2>α1). Therefore, the impregnation property can be improved even if the depressurization rate is reduced.

Figure 10A:
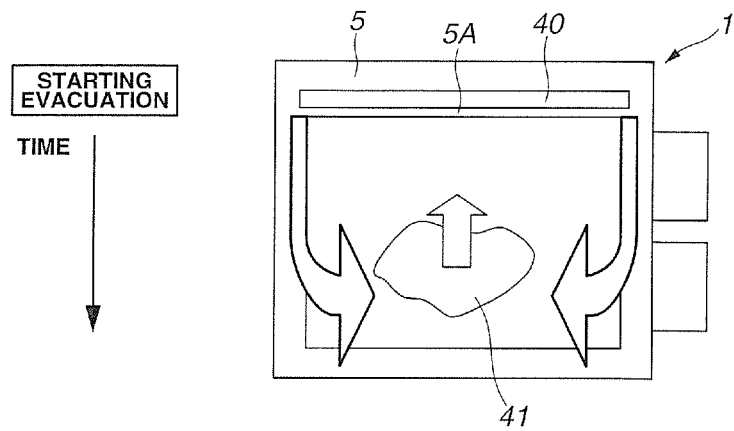
FIG. 10 is an explanation drawing to explain a relation between extension of a depressurization time and improvement of an impregnation property.
Figure 10B:
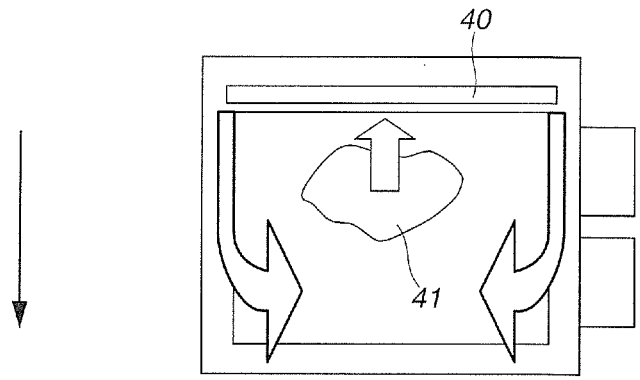
Figure 10C:
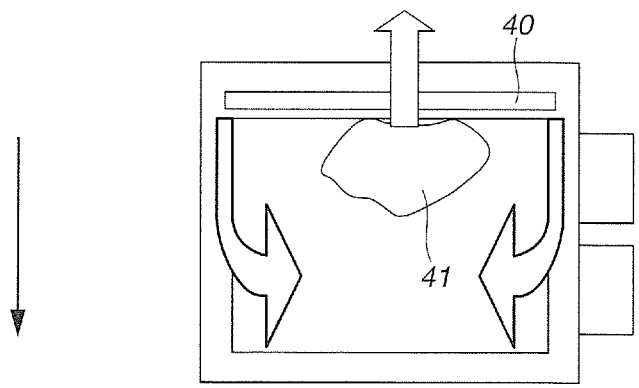

FIG. 10 is an explanation drawing to explain a relation between extension of the depressurization time and improvement of the impregnation property. As shown in FIG. 10, all of the liquid electrolyte injected at the time of the injection is not impregnated to the inside of battery 1 soon but, as shown with sign 40 of the drawing, most of it remains once at the upper end of electrode laminated body 4, that is, at the vicinity of opening portion 5A. Liquid electrolyte 40 remaining at the upper end is not impregnated to a lower side of electrode laminated body 4 but, as shown in FIG. 10 (B), flows down to the lower side through both side parts having relatively an enough space of electrode laminated body 4 (see FIG. 2), following which it is impregnated to both sides and the lower side of electrode laminated body 4, and is impregnated toward an upper side from the lower side of electrode laminated body 4. After that, liquid electrolyte 40 is impregnated to the inside of electrode laminated body 4 from all directions.

Here, as mentioned above, in the case where vacuum attainment time ΔT exceeds first threshold ΔTs1, the impregnation does not progress excellently, gas 41 remains inside outer case body 5, and liquid electrolyte 40 remains at the upper end. That is, an upper side of remaining gas 41 becomes in a state of being closed by liquid electrolyte 40, and it becomes in a state in which a replacement (impregnation) between gas 41 and the liquid electrolyte tends not to progress.

In this way, when evacuation is performed to a cell (battery) having a part where the liquid electrolyte is not impregnated in the sealing step after atmosphere open, first, a periphery of the cell is depressurized, and a pressure difference between the pressure of the periphery of the cell and the pressure that is approximately atmospheric pressure of the gas remaining inside the cell arises. With this pressure difference and the weight difference between the liquid electrolyte and the remaining gas, as shown in (B) and (C) of FIG. 10, the liquid electrolyte sinks and remaining gas 41 gradually rises.

At this time, if the depressurization rate is high, before remaining gas 41 rises, liquid electrolyte 40 remaining at the vicinity of the upper end of the cell is bumped, and the leakage of liquid electrolyte 40 occurs and the remaining gas cannot be excellently exhausted. In this way, by focusing on a characteristic that a sharp depressurization affects not remaining gas 41 but liquid electrolyte 40, in the present embodiment, the lowering of the pressure is set to be slow by reducing the depressurization rate and the depressurization time is extended, and thereby, without occurrence of the bumping and the bubbling of the liquid electrolyte, remaining gas 41 gradually rises and, in the end, remaining gas 41 is excellently exhausted through opening portion 5A of the top end of outer case body 5.

However, if the vacuum attainment time and the depressurization time become longer, working hours become longer, and production efficiency deteriorates. Therefore, in the present embodiment, at the time when vacuum attainment time ΔT exceeds second threshold ΔTs2 that is smaller than first threshold ΔTs1, warning is given to warn workers that liquid injecting chamber 14 needs to be cleaned. In response to this warning, the workers clean liquid injecting chamber 14. By this cleaning, the liquid electrolyte remaining in liquid injecting chamber 14 that is a cause of a delay of the vacuum attainment time is decreased, and it is possible to suppress or solve a problem that the cell having the part where the liquid electrolyte is not impregnated is produced.

The invention claimed is:

1. A method for manufacturing a battery in which an electrode laminated body and a liquid electrolyte are sealed inside an outer case body of the battery, the method for manufacturing the battery comprising:
   depressurizing an inside of a liquid injecting chamber to a vacuum state using a liquid injecting vacuum pump in a first depressurization;
   injecting, in the inside of the liquid injecting chamber which has been depressurized, the liquid electrolyte into the battery through an opening portion formed at a top end of the outer case body of the battery;
   depressurizing an inside of a sealing chamber at which the battery has been positioned to the vacuum state using a sealing vacuum pump in a second depressurization; and
   sealing the opening portion in the inside of sealing chamber which has been depressurized,
   wherein a vacuum attainment time until a pressure of the inside of the liquid injecting chamber becomes at a predetermined vacuum degree is measured in the first depressurization, and
   wherein, based on the vacuum attainment time, at least one of a depressurization rate and a depressurization time by the sealing vacuum pump is changed.

2. The method for manufacturing the battery according to claim 1, wherein the depressurization rate by the sealing vacuum pump is reduced in a case where the vacuum attainment time exceeds a first judgement time.

3. The method for manufacturing the battery according to claim 2, wherein a warning is given in a case where the vacuum attainment time exceeds a second judgement time that is a time shorter than the first judgement time.

4. The method for manufacturing the battery according to claim 1, wherein the depressurization time by the sealing vacuum pump is extended in a case where the vacuum attainment time exceeds a first judgement time.

5. The method for manufacturing the battery according to claim 1, further comprising, between the injecting and the second depressurization, an impregnation step of impregnating the liquid electrolyte to an inside of the battery by allowing the battery to stand still in atmospheric pressure conditions.

6. A device for manufacturing a battery in which an electrode laminated body and a liquid electrolyte are sealed inside an outer case body of the battery, the device for manufacturing the battery comprising:
   a liquid injecting vacuum pump for depressurizing an inside of a liquid injecting chamber to a vacuum state;

a liquid injecting pump for injecting, in the inside of the liquid injecting chamber which has been depressurized, the liquid electrolyte into the battery through an opening portion formed at a top end of the outer case body of the battery;

a sealing vacuum pump for depressurizing an inside of a sealing chamber at which the battery has been positioned to the vacuum state;

sealing blocks for sealing the opening portion in the inside of the sealing chamber which has been depressurized;

a sealing controller configured to:
  measure a vacuum attainment time until a pressure of the inside of the liquid injecting chamber is reduced to a predetermined vacuum degree by the liquid injecting vacuum pump; and
  change, based on the vacuum attainment time, at least one of a depressurization rate and a depressurization time by the sealing vacuum pump.

* * * * *